United States Patent [19]

Wendhack

[11] Patent Number: 5,482,300
[45] Date of Patent: Jan. 9, 1996

[54] COLLET ADAPTER FOR CONVERTING MACHINE VISE TO A COLLET FIXTURE

[76] Inventor: Kurt F. Wendhack, 700 Perrie Dr. Unit 308, Elk Grove Village, Ill. 60007

[21] Appl. No.: 265,270

[22] Filed: Jul. 1, 1994

[51] Int. Cl.⁶ .......................... B23B 31/20; B23Q 3/06; B25B 1/02
[52] U.S. Cl. ................. 279/51; 269/88; 279/143
[58] Field of Search ................ 279/50, 51, 143, 279/145; 269/88; 409/225

[56] References Cited

U.S. PATENT DOCUMENTS 2,621,938  12/1952  Ziegler ........................ 279/50
4,943,071  7/1990  Srebot et al. ................ 279/50

Primary Examiner—Steven C. Bishop

[57] ABSTRACT

An adapter for converting a standard machine vise into a set-up collet fixture including front and back supports that bolt to the vise jaws after the vise jaw plates have been removed, an internally tapered sleeve in the supports for engaging a taper on a standard 5C Collet, and a take-up nut seated in the back support for engaging threads on the end of the collet to hold the collet stationary to the vise as the vise is opened causing the front support to move away from the back support pulling the sleeve over the stationary collet thereby causing the collet to clamp the workpiece.

13 Claims, 5 Drawing Sheets

COLLET ADAPTER FOR CONVERTING MACHINE VISE TO A COLLET FIXTURE

BACKGROUND OF THE PRESENT INVENTION

Metal working shops and plants commonly use devices referred to as "collet fixtures" for holding bar stock on machine beds or tables as the workpieces are machined by such operations as milling, drilling, tapping and grinding. Most of these collet fixtures have a workpiece clamping and engaging element called a "5C Collet" which is a collet similar to those found in milling machine spindles for holding and clamping milling tools except the 5C Collets are externally threaded rather than internally threaded as in the milling tool collets.

The 5C Collet is conventionally machined from round bar stock and includes a central through bore, a single diameter shank portion with a threaded end, and a frusto-conical portion at the opposite end having a plurality of slots milled radially therethrough that extend through to the central bore. As the resulting frusto-conical segments are cammed by some external taper, they flex inwardly grasping the cylindrical bar stock workpiece thereby holding it firmly in position.

There are generally two types of collet fixtures presently popular in the machine tool industry, one that includes an axially fixed 5C Collet that utilizes a movable member for camming the collet closed, and one that utilizes a movable collet that engages a stationary camming surface for causing the collet to close. In both cases, however, these collet fixtures include a supporting frame that must be aligned, referenced, and clamped and bolted to the machine bed, whether it be a drilling machine, a tapping machine or a grinding machine.

One such collet fixture is the Yuasa collet fixture having a Rutland Tool and Supply Co., Inc.(City of Industry, California), Part No. 2411-5360(1994). This collet fixture includes a cast iron rectangular base that is bolted to the machine bed carrying a plurality of sleeves and nuts that surround a collet for holding the workpiece in position. A lever action indexing handle permits these sleeves and rings to be rotated so that the workpiece can be machined at various angles. The collet slides inside this type of fixture. It is held in place by an adjusting nut. Rotation of the sleeve assembly is controlled by the use of a key in the fixture and a key way in the collet. As the fixture mechanism is actuated, the collet is drawn into an internal taper. As pressure increases, the taper in the fixture forces the taper on the collet to collapse, closing the inside of the collet. In this style of fixture, the collet moves until the workpieces clamps. The smaller the workpiece, the farther the collet must travel to achieve its goal. Until clamping occurs, both the collet and the work move together. If the work varies in size, the position of the work in its set-up varies proportionately. Controlling the work size may be required for an efficient set-up.

The second type of collet fixture commonly found in the industry utilizes a fixed collet actuated by a movable sleeve. One such collet fixture is referred to as a horizontal and vertical 5C Collet fixture, Part No. 2404-0005 also sold by Rutland Tool and Supply. This fixture utilizes a sleeve with an inside taper matching that on the collet. The collet is held in place in the fixture by an adjusting nut. As the fixture mechanism is actuated, the sleeve moves rather than the collet. The taper in the sleeve is forced into the taper on the collet. The collet responds by collapsing until it firmly embraces the workpiece. The smaller the workpiece, the farther the sleeve must travel to fully engage the collet. Since the collet does not move, the size of the work does not effect the position of the work. The disadvantage to this style is that it does not allow the use of step chucks.

The disadvantage in both of these types of collet fixtures is that they require very accurate set-up and clamping to the machine bed or table before they can be utilized.

There have also been provided in the past collet block checks that are essentially tapered sleeves that can be clamped in a vise that are designed to receive 5C Collets. These essentially are simply square blocks with a collet receiving opening therethrough or hexagonal blocks, both of which are clamped directly in the machine vise. These block chucks require alignment in the vise with respect to the machining axis or axes in the same way that the collet fixtures do, and they also lack the structural integrity required for many machining operations. Also clamping and unclamping occurs either by tightening a nut on the collet with a spanner wrench or via a small cam actuating lever. The latter lacks strength and rigidity and the spanner wrench consumes valuable production time.

It is a primary object of the present invention to ameliorate the problems noted above in 5C Collet fixtures.

SUMMARY OF THE PRESENT INVENTION

In accordance with the present invention, an adapter is provided for converting a standard machine vise into a set-up collet fixture that in most cases eliminates the requirement for set-up in the 5C Collet fixtures presently known in the metal working industry. As described above, the collet fixtures presently known in the industry require clamping and mounting to the machine bed or table in preparation for workpiece machining. This set-up includes the accurate vertical and horizontal alignment of the axis of the fixture with the axes of the table upon which it is mounted. This is not only a critical set-up but also one that is time-consuming for the machine operator.

It is quite common in metal workpiece machining departments for machine vises to remain mounted on the machine table in a set-up position; i.e., aligned with the machine axes, for long periods of time to eliminate the need for removal and remounting. Thus, the mounted machine vise becomes an extremely convenient location for a collet fixture because if so utilized it would eliminate the need for collet fixture alignment to the machine axes. This is what the present invention accomplishes, and it does so with an adapter that after removal of the vise jaw plates from the machine vise, bolts to the vise jaw plate receiving holes in the vise jaws which locates the adapter in x, y and z orthogonal coordinates with respect to the machine tool frame.

This converting adapter includes front and back supports that bolt to the vise members, an internally tapered sleeve in the supports for engaging the taper on a standard 5C Collet in the sleeve, and a nut seated in the back support for engaging threads at the end of the collet for holding the collet stationary to the vise as the vise is opened. Vise opening causes the front support to move axially away from the back support, pulling the sleeve over the stationary collet and causing the collet to clamp the workpiece.

While the present invention is embodied in this disclosure by a fixture in which the collet remains stationary and the sleeve is movable, it is within the scope of the present invention to provide an adapter in which the collet is movable and the collet actuator is stationary.

Other objects and advantages of the present invention will appear more clearly from the following detailed description of the invention.

DETAILED DESCRIPTION OF THE PREFERRED EMBODIMENT

Figure 1:
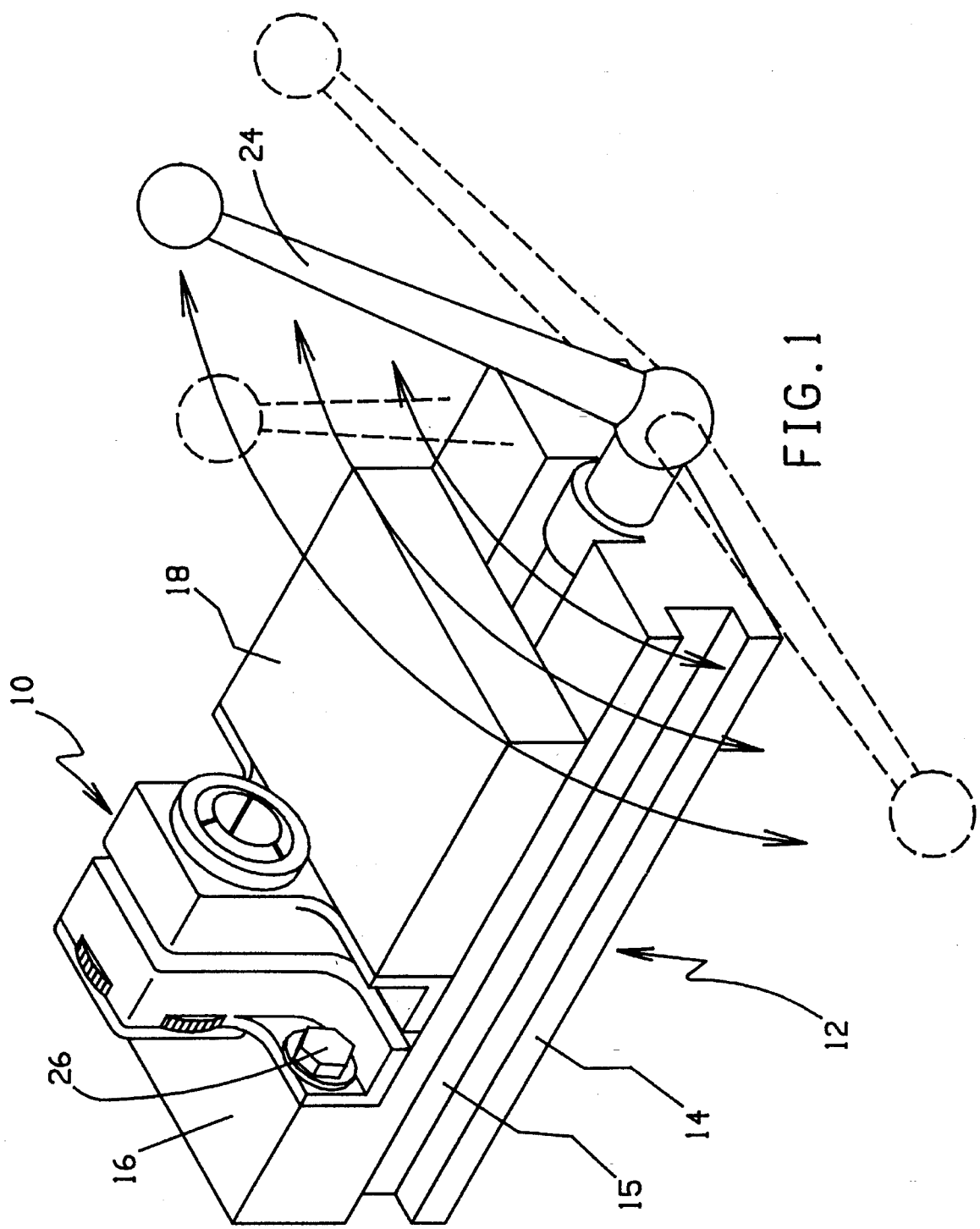
FIG. 1 is a perspective view of the present adapter shown mounted in a standard machine vise.

Viewing FIG. 1, a collet adapter 10 is illustrated in accordance with the present invention mounted in a standard machine vise 12. The machine vise 12 includes a stationary base 14 having side channels 15 that are utilized with clamping systems to clamp the vise to the machine bed or table. A stationary jaw member 16 is fixed to the base 14 and a movable jaw member 18 is reciprocated by a screw 20 carried by the base 14, having a hexagonal stub shaft 22 rotated by(FIG. 5) an actuating arm 24(FIG. 1).

The adapter 10 is mounted to the vise members 16 and 18 with four threaded bolts 26(two in member 16 and two in member 18) that are normally utilized to fasten the jaw plates to the members 16 and 18. The jaw plates are thus removed from the members 16 and 18 prior to bolting the adapter 10 into the vise.

Figure 2:
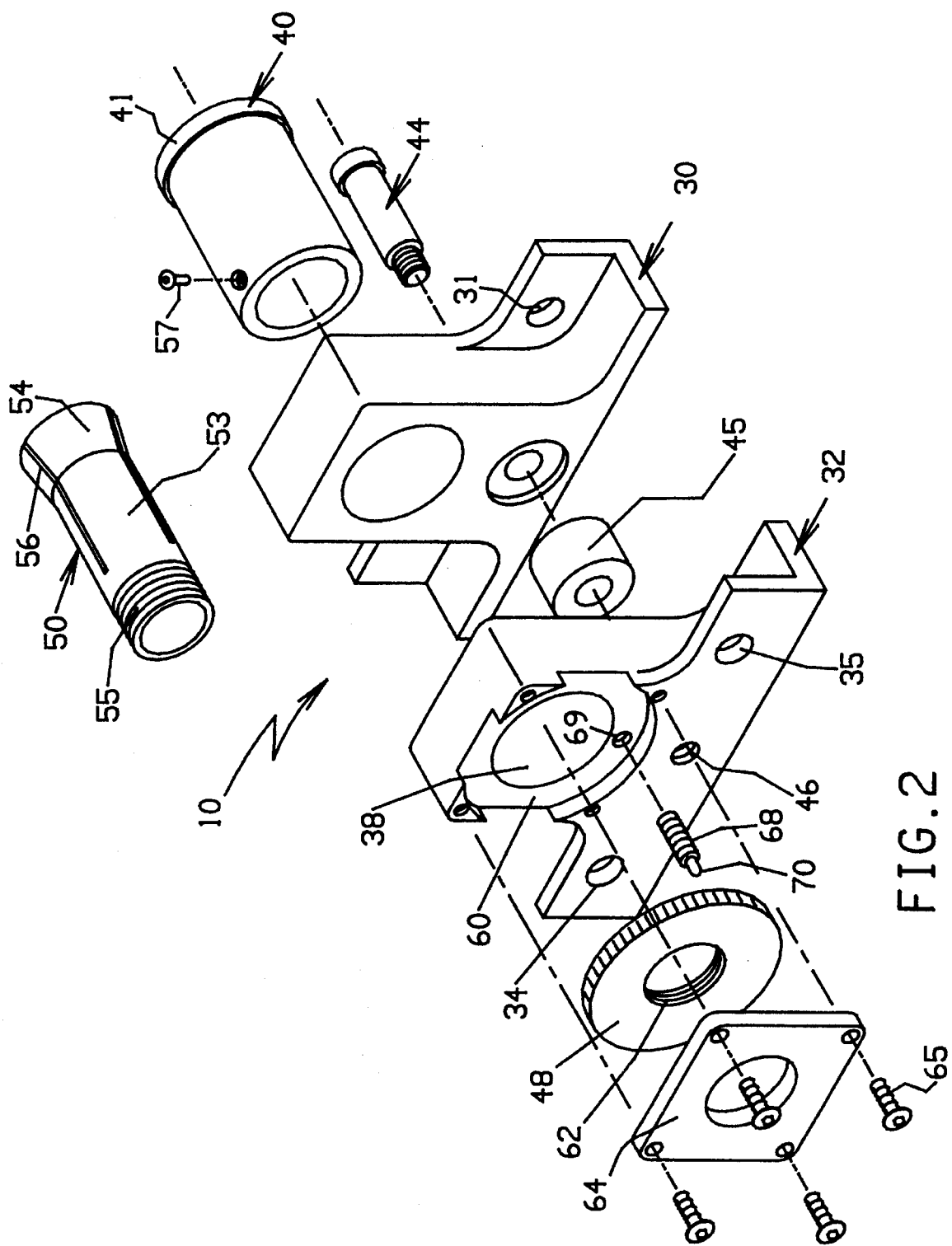
FIG. 2 is an exploded rear perspective of the converting adapter according to the present invention.
Figure 4:
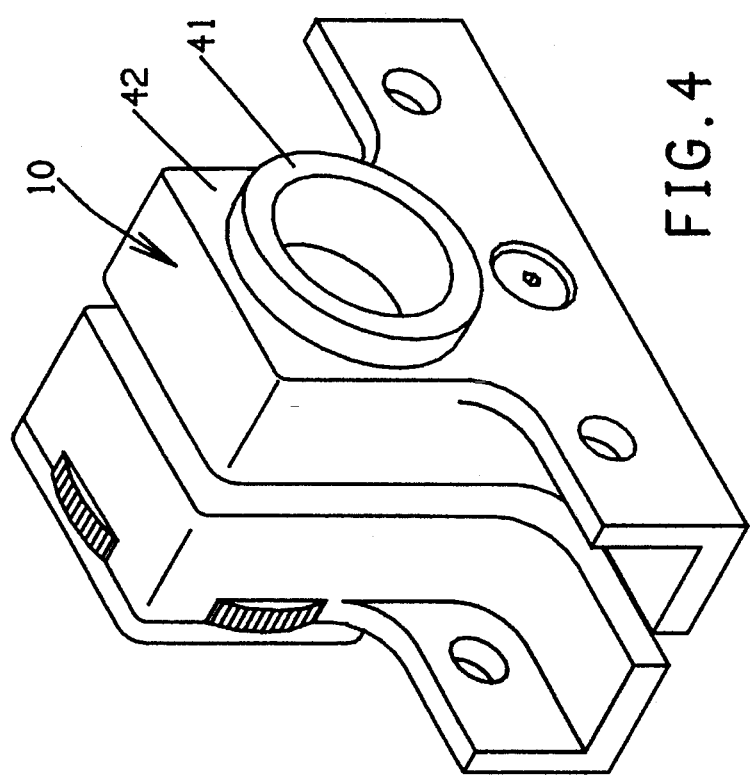
FIG. 4 is a front perspective assembly view of the adapter.
Figure 3:
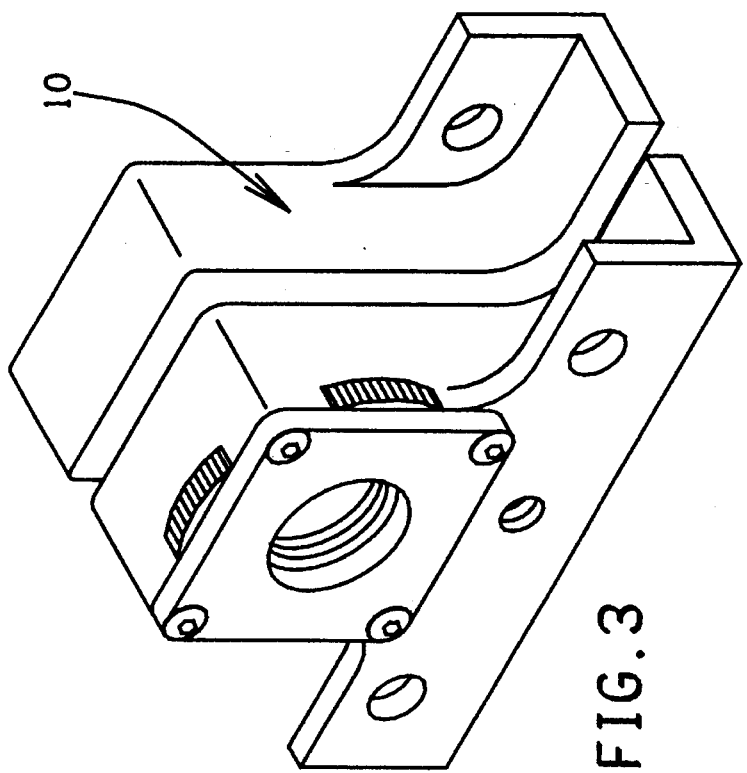
FIG. 3 is a rear perspective assembly back view of the adapter.

The perspective view of FIG. 2, which is limited to the collet and adapter 10, provides an excellent insight into the internal construction of the adapter, which includes a front support 30 bolted to vise member 18 through apertures 31, and a back support 32 bolted to the vise member 16 through apertures 34 and 35. Both the front and back supports 30 and 32 have upstanding central portions with aligned through bores 37 and 38 therethrough for receiving sleeve 40. Sleeve 40 has a shoulder 41 that engages forward surface 42(FIG. 4) of the front support, and bore 37 has an interference fit with the outer diameter of the sleeve 40 and bore 38 has a 0.002 to 0.003 slip fit because sleeve 40 slides in bore 38 during operation of the fixture while it remains stationary with respect to the front support 30.

The front and back supports 30 and 32 are held together by a shoulder screw 44 that extends through the front support 30, through an annular gap check 45 and is threaded into aperture 46 in the back support 32.

Figure 5:
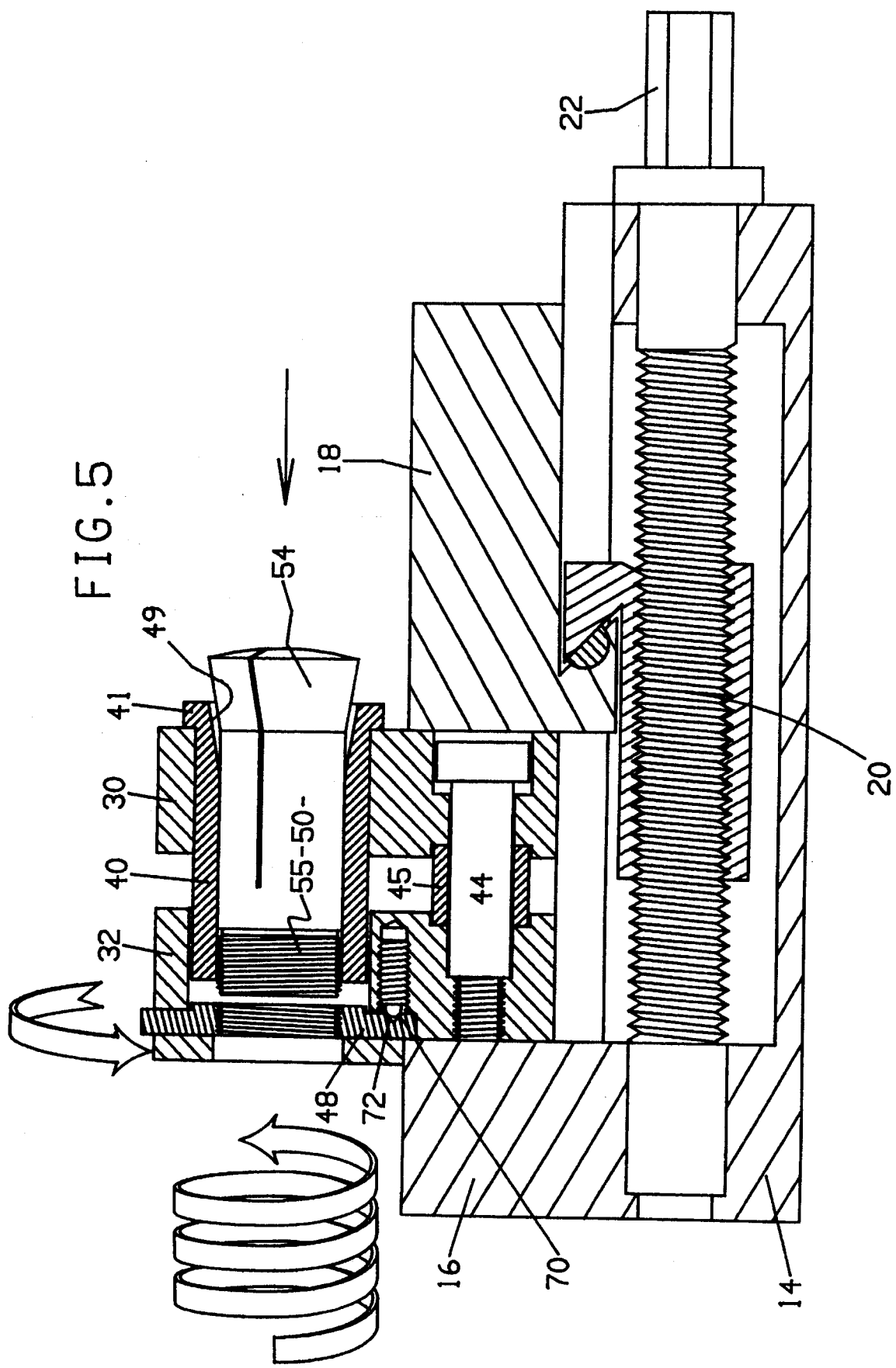
FIG. 5 is a longitudinal section through the present adapter and machine vise in preparation for assembly of the collet into the adapter.

The annular gap check 45, as seen in FIG. 5, limits the minimum space between the front support 30 and the back support 32 to prevent the sleeve 40 from being pressed out of the front support 30 by take-up nut 48 as the front support moves toward the back support.

As seen more clearly in FIG. 5, sleeve 40 has a forward internal taper 49 at its forward end.

Collet 50 is receivable in sleeve 40 and has a stepped internal workpiece engaging the bore 52, a cylindrical shank portion 53, a forward frusto-conical portion 54, and an externally threaded rear portion 55. The shank portion 53 and the frusto-conical portion 54 have a plurality of radial slots 56 therein that permit flexure of the collet segments inwardly against the workpiece when cammed by surface 49 on sleeve 40.

Figure 6:
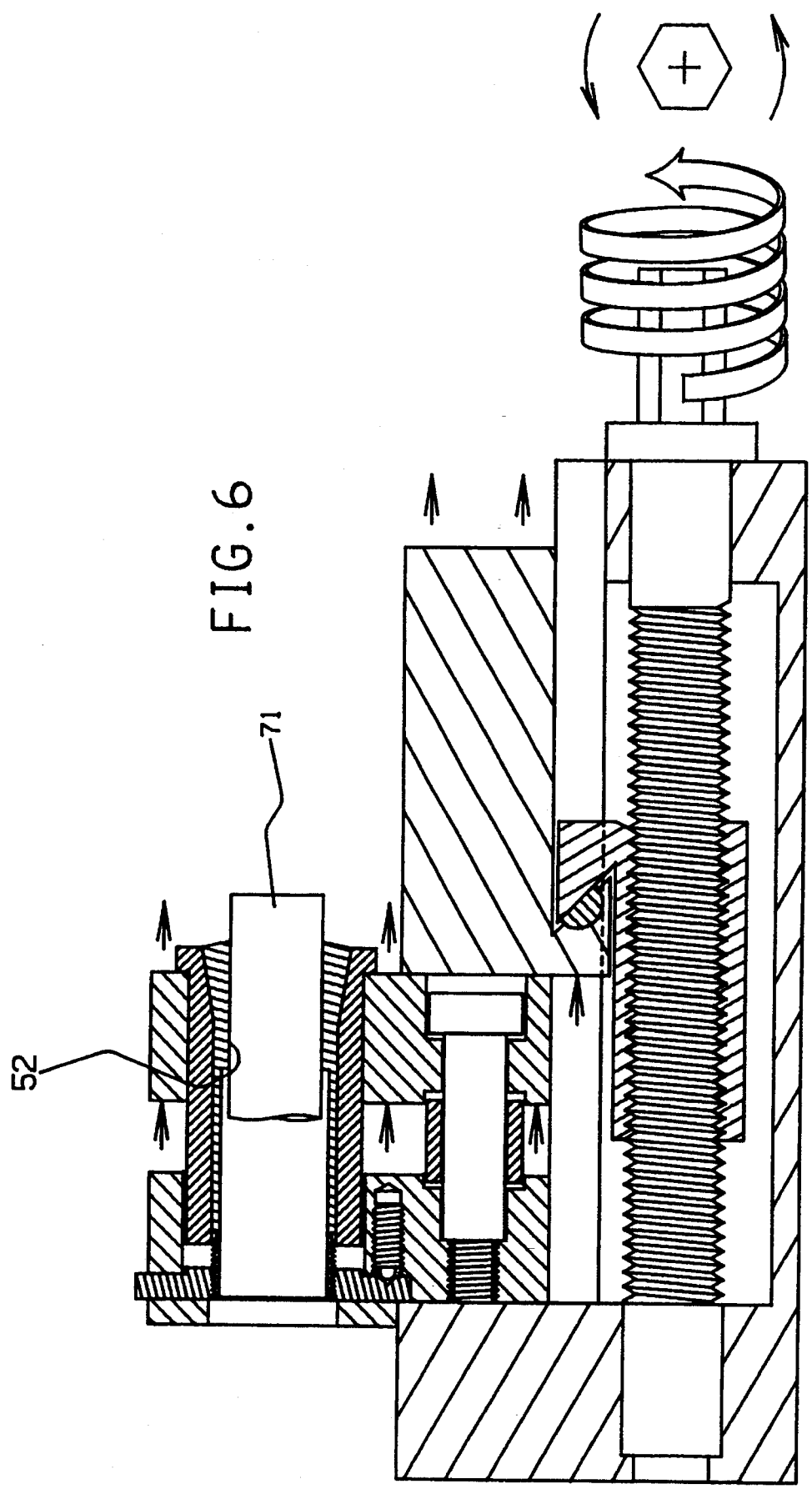
FIG. 6 is a longitudinal section similar to FIG. 4 after vise opening and workpiece clamping.

The rear of the back support 32 has an annular recess 60 therein that rotatably receives the take-up nut 48 which has internal threads 62 adapted to thread onto the collet threads 55 as shown in FIGS. 5 and 6. The nut 48, while freely rotatable in recess 60, is axially fixed to the back support 32 by square cover plate 64 that is fastened to the back support by four cap screws 65.

A spring detent assembly 68 is seated in an aperture 69 in back support recess 60 and has a detent 70 engageable with one of a plurality of annularly arrayed recesses in the front of the nut 48(See FIG. 5) to provide semi-positive indexing motion of the nut 48 and also to maintain the nut 48 in its adjusted position.

After mounting the adapter 10 to the vise 12 with fasteners 26 extending through the front and back supports 30 and 32, the desired collet is inserted into sleeve 40. By desired collet, I mean the collet with the appropriate diameter bore 52 therethrough that corresponds to the diameter of the workpiece 71(FIG. 6 to be machined). After bolting the adapter 10 to the vise, the vise is closed until the gap check annular member 45 is in full contact with both the front and back supports as shown in FIG. 5.

After inserting collet 50 into the sleeve 40, the take-up nut 48 is engaged with the collet threads 55 and rotated in the clockwise direction of the arrow shown in FIG. 5, drawing the collet 50 axially into the sleeve. The collet 50 is held rotationally fixed in the sleeve 40 by a cap screw 57 which seats in a 1/8 inch wide axial slot(not shown) in the outside of the collet 50. The nut 48 is turned on the collet until the collet just engages workpiece 71. At this point the nut 48 is backed up one full turn(about 10 to 12 clicks of the detent 70—there are 12 detent receiving recesses 72 in the forward face of the nut 48, See FIG. 5).

The vise actuator arm 24 is then rotated in a direction to open the vise(counter-clockwise) and this moves the front support 30 away from the rear support 32 drawing the sleeve 40 over the collet 50 which is at this time held axially stationary by the nut 48. Opening is continued until tapered surface 48 engages tapered collet surface 54 and further vise opening causes sleeve 40 to compress the collet into firm and fixed clamping engagement with the workpiece 71.

Of course, workpiece unclamping is achieved by rotating vise actuating arm 24 in the vise closing direction (clockwise).

I claim:

1. A collet adapter for converting a standard machine vise into a collet fixture wherein the vise includes relatively removable members, vise jaws and an actuator, comprising: a first support and a second support each having a bore therethrough aligned with one another, means on the first and second supports for fixedly attaching them to the vise members, a sleeve in the bores in the first and second supports having an axially tapered internal portion, a workpiece receiving collet in the sleeve having an axially tapered outer portion engaging the tapered internal portion in the sleeve, and means for moving the collet axially relative to the sleeve as the first support moves relative to the second support so a workpiece in the collet is radially clamped thereby, whereby upon movement of the vise actuator the vise members move the first and second supports effecting workpiece clamping and unclamping without requiring the set up of a conventional collet fixture.

2. A collet adapter as defined in claim 1, wherein the adapter includes a shoulder screw fixed to one of the first and second supports and slidable in the other to maintain alignment between and assembly of the first and second supports.

3. A collet adapter as defined in claim 1, wherein the means for moving the collet relative to the sleeve includes a nut rotatable in and axially fixed with respect to one of the first and second supports threadedly engaging one end of the collet to hold the collet stationary with respect to the one support as the vise actuator is moved to cause workpiece clamping and unclamping.

4. A collet adapter as defined in claim 1, wherein the sleeve has a shoulder engageable with the first support to hold the sleeve stationary with the first support as the vise actuator is moved to cause workpiece clamping, said means for causing relative axial movement between the sleeve and the collet including the sleeve shoulder and a nut rotatable in and axially fixed to the second support threadedly engaging one end of the collet to hold the collet stationary with respect to the second support.

5. A collet adapter as defined in claim 4, wherein the vise has a stationary member and a movable member, said first support being fixable to the movable vise member and said second support being fixable to the stationary vise member, so that upon separation of the vise members the first support will move the sleeve away from the second support, the collet and the workpiece will remain stationary with the second support and the sleeve will clamp the collet radially against the workpiece.

6. A collet adapter as defined in claim 1, including the stop to limit movement of the first and second supports toward one another, said stop being positioned to prevent movement of the sleeve with respect to one of the supports as the supports move toward one another.

7. A collet adapter as defined in claim 3, including a spring detent in said one support for maintaining the adjusted rotational position of the nut.

8. A collet adapter for converting a standard machine vise having a stationary jaw, a movable jaw, both with jaw holes for receiving jaw plates, and a threaded actuator, into a collet fixture, comprising: a front support connectable to the jaw plate bores in the movable jaw, a back support connectable to the jaw plate bores in the stationary jaw whereby upon movement of the vise actuator the first and second supports will move toward and away from one another, a bore extending through each support coaxially aligned with one another, a sleeve positioned in both bores having a shoulder engageable with the first support to limit movement of the sleeve in one direction with respect to the first support, said sleeve having an axial internal taper portion, a standard collet in the sleeve having an axially tapered outer portion engageable with the axially taper internal portion of the sleeve to cause radial contraction of the collet upon relative axial movement between the sleeve and the collet, a nut rotatable in and axially fixed with respect to the second support threadedly engaging one end of the collet to hold the collet in the adapter and prevent axial movement of the collet when the vise actuator is moved, whereby when the vise jaws are separated upon movement of the vise actuator, the first support will move away from the second support drawing the sleeve over the collet held stationary by the second support causing the collet to clamp the workpiece.

9. A collet adapter as defined in claim 8, wherein the adapter includes a shoulder screw fixed to one of the first and second supports and slidable in the other to maintain alignment between and assembly of the first and second supports.

10. A collet adapter as defined in claim 8, including a stop to limit movement of the first and second supports toward one another, said stop being positioned to prevent movement of the sleeve with respect to one of the supports as the supports move toward one another.

11. A collet adapter as defined in claim 8, including a spring detent in said one support for maintaining the adjusted rotational position of the nut.

12. A collet adapter for converting a standard machine vise having a stationary jaw, a movable jaw, both with jaw holes for receiving jaw plates, and a threaded actuator, into a collet fixture, comprising: a front support connectable to the jaw plate bores in the movable jaw, a back support connectable to the jaw plate bores in the stationary jaw whereby upon movement of the vise actuator the first and second supports will move toward and away from one another, a bore extending through each support coaxially aligned with one another, a sleeve positioned in both bores having a shoulder engageable with the first support to limit movement of the sleeve in one direction with respect to the first support, said sleeve having an axial internal taper portion, a standard collet in the sleeve having an axially tapered outer portion engageable with the axially taper internal portion of the sleeve to cause radial contraction of the collet upon relative axial movement between the sleeve and the collet, a nut rotatable in and axially fixed with respect to the second support threadedly engaging one end of the collet to hold the collet in the adapter and prevent axial movement of the collet when the vise actuator is moved, whereby when the vise jaws are separated upon movement of the vise actuator, the first support will move away from the second support drawing the sleeve over the collet held stationary by the second support causing the collet to clamp the workpiece, said adapter including a shoulder screw fixed to one of the front and back supports and slidable in the other to maintain alignment between and assembly of the front and back supports, a stop to limit movement of the front and back supports toward one another, said stop being positioned to prevent movement of the sleeve with respect to one of the supports as the supports move toward one another, and a spring detent in said one support for maintaining the adjusted rotational position of the nut.

13. A collet adapter for converting a standard machine vise into a collet fixture wherein the vise includes relatively removable members, vise jaws and an actuator, comprising: a first support and a second support, means on the first and second supports for fixedly attaching them to the vise members, a sleeve carried by one of the first and second supports having an axially tapered internal portion, a workpiece receiving collet in the sleeve having an axially tapered outer portion engaging the tapered internal portion in the sleeve, and means for moving the collet axially relative to the sleeve as the first support moves relative to the second support so a workpiece in the collet is radially claimed thereby, whereby upon movement of the vise actuator the vise members move the first and second supports effecting workpiece clamping and unclamping without requiring the set up of a conventional collet fixture.

* * * * *